United States Patent [19]

Greenly et al.

[11] 4,183,663
[45] Jan. 15, 1980

[54] PROCESS FOR MAKING MULTICOLORED PHOTOGRAPHIC SLIDES AND APPARATUS THEREFOR

[76] Inventors: Robert B. Greenly, 1250 Rembrant Dr., Sunnyvale, Calif. 94087; George A. Paz, 74 Woodhams Rd., Santa Clara, Calif. 95051; Gerald Tignanelli, 385 S. Pastoria Ave., Sunnyvale, Calif. 94086

[21] Appl. No.: 939,269

[22] Filed: Sep. 5, 1978

[51] Int. Cl.² .............. G03B 27/32; G03B 27/04; G03B 27/42
[52] U.S. Cl. .................. 355/77; 355/53; 355/88
[58] Field of Search .......... 354/295, 291; 355/32, 355/53, 72, 77, 79, 88, 132

[56] References Cited

U.S. PATENT DOCUMENTS

| | | | |
|---|---|---|---|
| 1,508,509 | 9/1924 | Douglass | 355/122 |
| 2,693,126 | 11/1954 | Pohl | 355/77 |
| 2,927,857 | 3/1960 | Pohl | 355/32 X |
| 3,264,106 | 8/1966 | Alldis | 355/79 X |
| 3,306,176 | 2/1967 | Myers | 355/132 X |
| 3,741,649 | 6/1973 | Podesta et al. | 355/88 |
| 3,941,463 | 3/1976 | Wetzel et al. | 355/88 X |
| 4,003,653 | 1/1977 | Kelly | 355/32 X |

*Primary Examiner*—Donald A. Griffin
*Attorney, Agent, or Firm*—Linval B. Castle

[57] ABSTRACT

Multicolored photographic slides, such as used for business or technical presentations, are produced by color photographing through a black and white negative back-lighted with a first color and then photographing a corresponding black and white positive back-lighted with a second color on the same colored slide film. Additional colors may be obtained by photographing through stacked negatives and positives in which portions of the negative have been selectively opaqued. The precision film registration required for the process is obtained by a novel platen assembly having spring-biased sprockets that engage the film perforations to firmly and accurately position the film.

10 Claims, 4 Drawing Figures

ORIGINAL BLACK ON WHITE ARTWORK

PHOTOGRAPH TO OBTAIN BLACK & WHITE NEGATIVE

CONTACT PRINT NEGATIVE TO OBTAIN BLACK AND WHITE POSITIVE

PHOTOGRAPH NEGATIVE BACKLIGHTED WITH FIRST COLOR WITH COLOR FILM

WITH SAME COLOR FILM PHOTOGRAPH POSITIVE BACKLIGHTED WITH SECOND COLOR AND PROCESS INTO SLIDE

ORIGINAL BLACK ON WHITE
ARTWORK
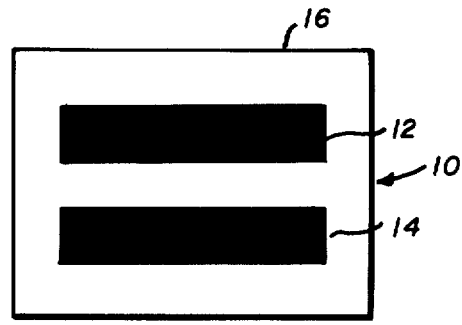
PHOTOGRAPH TO OBTAIN BLACK
& WHITE NEGATIVE
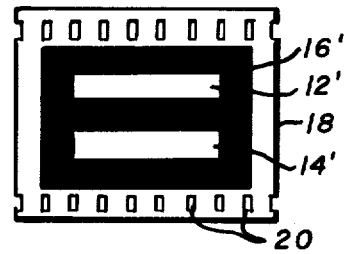
CONTACT PRINT NEGATIVE TO
OBTAIN BLACK AND WHITE
POSITIVE
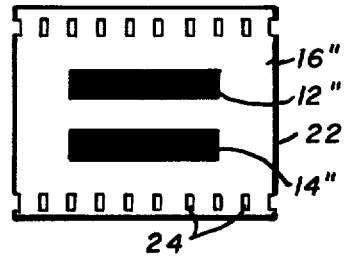
PHOTOGRAPH NEGATIVE
BACKLIGHTED WITH FIRST
COLOR WITH COLOR FILM
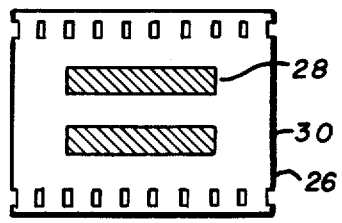
WITH SAME COLOR FILM PHOTOGRAPH
POSITIVE BACKLIGHTED WITH SECOND
COLOR AND PROCESS INTO SLIDE
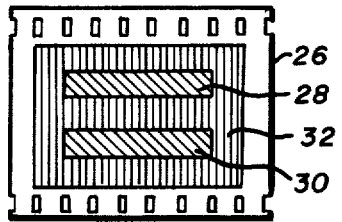
Fig_1

ORIGINAL BLACK AND WHITE ARTWORK 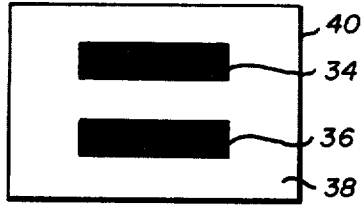

PHOTOGRAPH TO OBTAIN TWO OR MORE BLACK AND WHITE NEGATIVES ONE COMPLETE, ONE OF EACH SECTION TO BE PROCESSED WITH DIFFERENT COLORS 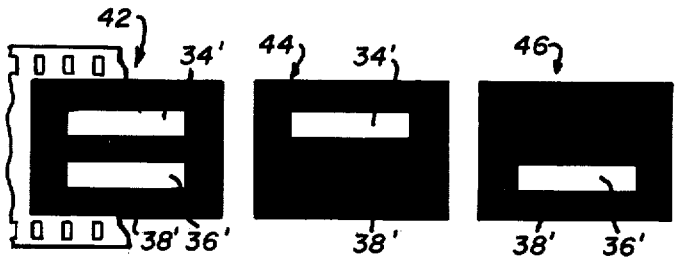

CONTACT PRINT COMPLETE NEGATIVE TO OBTAIN BLACK AND WHITE POSITIVE 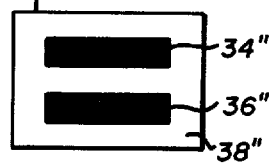

SELECT COLORED POSITIVE HAVING DESIRED BACKGROUND SCENE 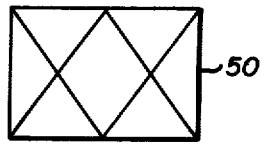

SANDWICH SCENE WITH BLACK AND WHITE POSITIVE AND PHOTOGRAPH IN COLOR 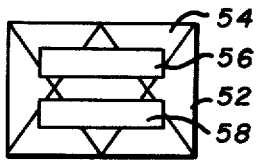

WITH SAME COLOR FILM, PHOTOGRAPH FIRST BLACK AND WHITE NEGATIVE BACKLIGHTED WITH FIRST COLOR 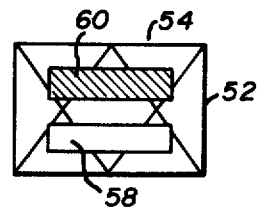

WITH SAME COLOR FILM, PHOTOGRAPH SECOND BLACK AND WHITE NEGATIVE BACKLIGHTED WITH SECOND COLOR AND PROCESS INTO SLIDE 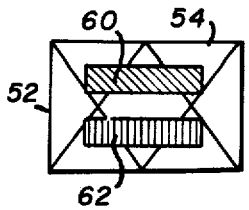

*Fig. 2*

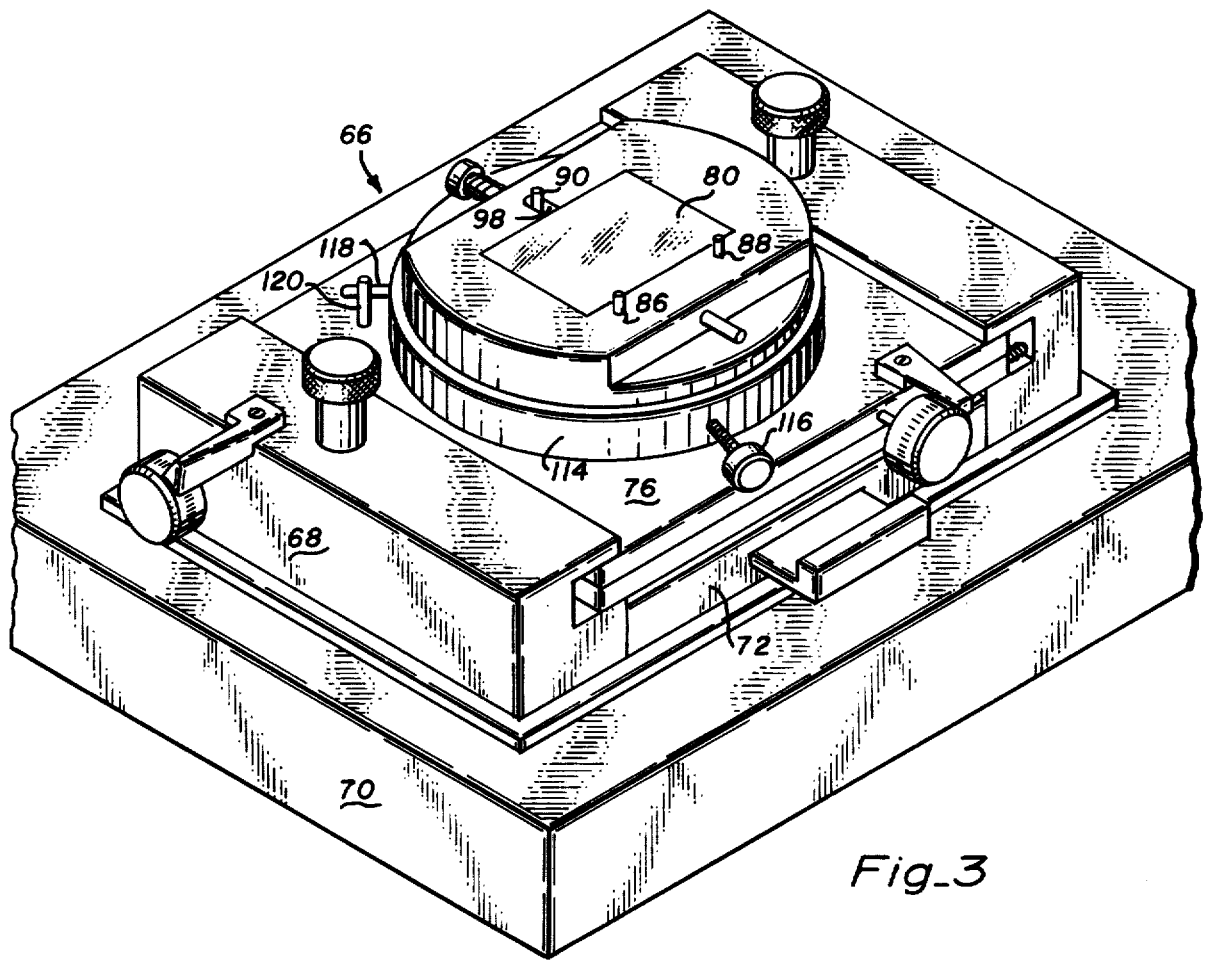
Fig_3
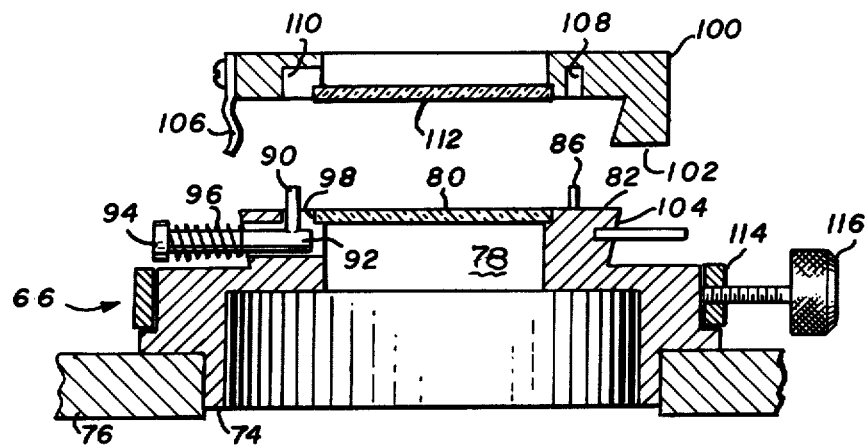
Fig_4

4,183,663

PROCESS FOR MAKING MULTICOLORED PHOTOGRAPHIC SLIDES AND APPARATUS THEREFOR

BRIEF SUMMARY OF THE INVENTION

This invention relates to color photography and particularly to a process and apparatus for producing multicolor art work photopositives that are particularly useful for color-on-color presentation slides.

There are several present methods for producing colored slides such as used in conjunction with industrial presentations, training seminars, business trend exhibits, etc. One such method of producing a projection slide includes the cutting and piecing together of various colored gelatin filters and sandwiching the pieces into a slide mount with a black and white transparency. Another method particularly useful for projecting bar graphs or the like is to tint a black and white film transparency with suitably colored transparent inks. A third and obvious method is to photograph colored art work with suitable color film and process into the required slide. In addition, projection slides may be made by an additive color process in which a background is first uniformly exposed with one color and photographed, after which each portion to be illustrated in a different color, such as a line of titles or bar of a graph, is exposed through a negative mask through colored filters and photographed on the same film. While this additive process generally produces good results, it is essential to understand the results of combining various colors and further requires precise control of the exposures, light source, processing and filter characteristics.

The process of the present invention may be employed to easily and quickly produce professional quality color-on-color slides from original black and white art work by the use of colored filters and both negative and positive masks.

Briefly described, the process of the invention includes the steps of making one or more black and white negatives from art work and contact printing a negative on black and white film to obtain a corresponding black and white positive. The black and white negatives and positive are made on films having sprocket perforations which are precisely registered in the process so that no light can pass through any positive-negative sandwich. An existing colored slide of a scene, for example, may be sandwiched with the black and white positive and photographed with color film to produce a latent image of the scene with unexposed portions blocked by the opaque portions of the black and white positive. The same color film is then used to photograph a black and white negative back-lighted with a desired color light to fill in the unexposed portions remaining in the color film. If desired, several different colored portions may be applied by separately photographing, with the same color film, several negatives each with opaqued sections of the art work and each back-lighted with a separate color.

Very precise registration of positive and negative films is necessary to the process. The invention includes a novel platen assembly which will rigidly and accurately maintain the films in such precise registration through the use of sprocket pins that are spring-biased to stretch the film over the face of the platen.

DETAILED DESCRIPTION OF THE DRAWINGS

In the drawings which illustrate a preferred embodiment of the invention:

FIG. 1 is a flow diagram illustrating the steps and the production of a two-color slide;

FIG. 2 is a diagram illustrating the steps in the production of a two-color slide against a scenic background;

FIG. 3 is a perspective view illustrating the platen assembly for precise film alignment and registration; and FIG. 4 is a sectional elevation view of the platen assembly of FIG. 3.

DETAILED DESCRIPTION

The process steps schematically illustrated in FIG. 1 may be used to reproduce black and white art work in a desired first color against a background of a second color, a process particularly useful in making presentation slides for projecting written text material. The black and white art work may be prepared in any convenient size and format and for convenience, the art work 10 is illustrated in FIG. 1 as comprising two parallel black bars 12 and 14 on a white background stock 16.

The prepared art work 10 is then photographed with a black and white film and is processed to obtain a black and white negative 18, in which the white background stock 16 becomes an opaque background 16' and the black parallel bars 12 and 14 become transparent portions 12' and 14', respectively. It is important to the process that the film used in the various steps have edge perforations, such as the sprocket perforations 20. The process contemplates the use of a pre-perforated film, such as a 35 mm or 70 mm film; however, larger films, such as cut films, may be used if perforated as required. In the preparation of the black and white negative 18, it is advantageous to use a lithograph-type of film or one having very high contrast.

The negative film mask 18 is then contact printed on a similar lithograph-type black and white film to obtain a positive mask 22 in which the black parallel bars 12 and 14 of art work 10 are opaque sections 12" and 14" against a transparent background 16". In making the contact print positive mask 22 from the negative mask 18, it is important that the sprocket perforations 24 in the positive mask 22 are precisely aligned with the perforations 20 in the negative mask 18 so that when the positive mask 22 and negative mask 18 are sandwiched together with their perforations 24 and 20 in proper alignment, the transparent portions in the negative mask 18 will precisely align with the opaque portions in the positive mask 22 to appear as a solid opaque film frame.

The next step is to photograph either the negative mask 18 or the positive mask 22 with a desired color backlighting film. In FIG. 1, it will be assumed that the negative mask is first photographed using a camera having a suitable color film. Any suitable color camera may be used; however, if roll-type film is used, the camera must be capable of making multiple exposures without even a slight movement of the film. SLR cameras are particularly useful because of the ability to readily center images in the film plane but only a few are equipped to recock the shutter without at least some slight movement of the film. In the steps illustrated in FIG. 1, it will be assumed that the negative mask 18 will be back-lighted with a green color and photographed on a 35 mm color film 26. The transparent bars 12' and 14' in the negative mask 18 therefore produce a green latent image 28 and 30 on the film 26 while the opaque background 16' does not expose the film 26.

The last step is to expose the film 26 to fill in only the unexposed portions left by the opaque background 16' in the negative mask 18. The positive mask 22 is then backlighted with the desired color, such as red, and is photographed on the same film frame to produce a red latent image 32. The color film 26 is then removed from the camera and processed in the conventional manner into the desired slide.

In the above process it is apparent that precise registration of the negative and positive masks 18 and 22 is necessary to prevent any overlap between the green parallel bars 28 and 30 and the red background 32 in the final color slide 26. Registration tolerances between the masks are extremely small and any mask misregistration, such as may be caused by damaged film sprocket perforations, can cause a very undesirable shadow effect in the final image.

The steps illustrated in FIG. 2 of the drawings may be employed to produce a two-color slide on a scenic background as, for example, the name of a company in one color, its address in a second color, all against the background scene of the company buildings or products. As in the case of the steps in FIG. 1, the process steps of FIG. 2 start with the preparation of the art work which again is illustrated as two parallel black bars 34 and 36 on a white background 38. If it is desired to show the name of a company, its address, and background scene, the company name may be represented by the black bar 34, the address may be represented by the black bar 36, and the background scene will be later superimposed on the area occupied by the white background 38. The art work 40 is then photographed with lithographic-type black and white film to produce three negative masks 42, 44 and 46. It is important that each of these three negative masks are in near perfect registration so that when sandwiched together with the sprocket perforations properly aligned, there will be a corresponding alignment of the images. Most high quality SLR cameras are capable of making repeated photographs with such a perfect registration provided they are rigidly held against movement between the subsequent photographs. If a camera is incapable of repeated exposures with such proper registration, it will be necessary to produce a positive mask 48 by contact printing the negative mask 42 with a similar lithograph film, and then recontact printing the positive mask 48 into additional negative masks 44 and 46.

The negative mask 42, when processed, now contains a transparent title bar 34' and a transparent address bar 36' on an opaque background 38'. The negative mask 44, which when processed was identical with the mask 42, is then opaqued to eliminate the transparent address bar 36' and therefore shows only a transparent title bar 34' on the opaque background 38'. It will be understood that the negative masks 42, 44 and 46, as well as the positive mask 48, contain properly registered sprocket perforations which have been omitted from the drawing of FIG. 2 for convenience.

The negative mask 46 is then opaqued to remove the transparent title bar 34' and therefore displays only a transparent address bar 36' on an opaque background frame 38'.

The positive mask 48 produced by contact printing on lithograph film from the negative mask 42 contains, when processed, an opaque title bar 34" and a parallel opaque address bar 36" on a transparent background 38". As indicated above, the positive mask 48 is on a photolith-type of film containing edge sprocket perforations precisely aligned with the perforations in the negative masks 42, 44 and 46 so that, if positive mask 48 is sandwiched together with either the negative mask 42 or both negative masks 44 and 46, they would appear as a solid opaque frame when back-lighted.

The next step is to select a background slide 50 which may be a color slide of various products or other scene over which the title bar 34 and address bar 36 will be displayed, each in a separate color. The existing slide 50 is then sandwiched with the positive mask 48, and is backlighted with white light and photographed on color film to produce on the color film 52 the latent image 54 of the scene of background slide 50 but with bars 56 and 58, corresponding to the title and address bars 34" and 36" of the positive mask 48, remaining unexposed.

The positive mask 48 and background slide 50 are then carefully replaced with the negative mask 44 which contains the transparent title bar 34'. Negative mask 44 is back-lighted with a desired color, such as green light, and photographed with the same color film to produce latent images of the background scene 54 and the title bar 60, leaving the address bar 58 unexposed.

Finally, the negative mask 44 is carefully replaced with the negative mask 46 which is back-lighted with the desired color, such as red, and photographed on the same color film to produce a green title bar 60, a red address bar 62 on a desired background scene 54. The color film 52 is then processed by the conventional process into the color-on-color slide.

As mentioned in the description of the above processes, precise registration of the various films is necessary in making a contact printed positive mask from a negative mask and the positioning of the various back-lighted positive and negative masks and sandwiched masks with respect to the camera platform. FIG. 3 is a perspective drawing illustrating a novel platen assembly for rigidly positioning and retaining films having edge perforations, such as the sprocket perforations on standard 35 mm film. The platen assembly 66 is preferably mounted on a movable X-Y stage 68 so that it may be adjusted as desired with respect to a stationary overhead camera. Platen assembly 66 in the stage 68 may be mounted to the top of a conventional slide duplicator 70 containing appropriate light sources. Located between the X-Y stage 68 and the slide duplicator 70 is a filter drawer 72 into which may be positioned the desired colored filters used during the process.

As shown in the sectional elevation view of FIG. 4, the platen assembly 66 has a circular base section 74 that rotatably fits into a corresponding aperture in the top plate 76 of the X-Y stage 68. The base section 74 of the assembly 66 is hollow and circular and the upper end terminates into a rectangular aperture 78 having dimensions corresponding to the frame size of the films used in the process.

Overlying the rectangular aperture 78 in the platen assembly 66 is a cover glass 80, the top surface of which is coplanar with the flat top surface 82 of the platen. A pair of registration pins 86 and 88 extend vertically from the top surface 82 and parallel with the longitudinal edge of the cover glass 80. The spacing between pins 86 and 88 correspond to spacing between approximately six sprocket perforations on a standard 35 mm film.

Vertically extending from the top surface 82 of the platen and on the side opposite pins 86 and 88, is a spring-biased registration pin 90. As best illustrated in FIG. 4, the pin 90 extends from a horizontal sliding pin 92 having on its exterior end an enlarged portion that provides a handle 94. Between the handle 94 and the side wall of the platen assembly is a spring 96 which acts to force the pin 90 in a direction away from the opposite pins 86 and 88. As shown in FIG. 3, the pin 90 extends through a lateral slot 98 in the top surface 82 of the platen so that the pin 90 is permitted a lateral spring-biased movement of approximately one-eighth inch. Spacing between pin 90 and the opposite pins 86 and 88 is such that the three pins will engage film perforations when the slide pin handle 94 is depressed and the pin 90 is against the edge of the cover glass 80. When the slide pin handle 94 is released, the spring 96 biases the pin 90 away from the opposite pins and rigidly holds the contained film.

With the film positioned on the glass plate 80 and stretched between pins 86, 88 and 90, a platen cover 100 is attached over the top surface of the platen. Platen cover 100 is provided with a dovetailed extension 102 that is adapted to engage a corresponding dovetail section 104 along one side of the platen assembly 66. The opposite side of the platen cover 100 is provided with a resilient spring clip 106 that engages a dovetail section on the side of the platen assembly 66 opposite the dovetail section 104. The purpose of the dovetail sections is to assure a continuing tight fit of the platen cover 100 to the top of the platen 66. The platen cover 100 is provided with suitable slots to provide clearance to the registration pins 86, 88 and 90 extending from the top surface 82 of the platen assembly. The pin 86, for example, is adapted to loosely engage the aperture 108 and the sliding pin 90 loosely fits within a lateral slot 110 in the platen cover 100. The platen cover 100 also is provided with a suitable rectangular aperture corresponding to the rectangular aperture 78 in the platen and is further provided with a glass cover plate 112 which is coplanar with the lower surface of the platen cover so that film mounted to the registration pins 86, 88 and 90 is firmly pressed between the glass plates 80 and 112.

As previously mentioned, the platen assembly 66 is fitted within a circular aperture in the top plate 76 of the X-Y stage 68. The X-Y stage is provided to make small adjustments as necessary to position the photographic film in the platen assembly with respect to the stationary overhead camera platform. The platen assembly is provided with an adjustment ring 114 movably fitted around a collar in the platen assembly 66. Adjustment ring 114 is provided with a locking screw 116 which locks the ring 114 against the platen. Extending from ring 114 is a pin 118 which may engage a vertical registration pin 120 that extends from the surface of the X-Y stage top plate 76 as illustrated in FIG. 3. The platen assembly and adjustment ring 114 is normally rotated so that the pin 118 engages the pin 120; however, if it is desired to temporarily rotate the platen assembly 16 to obtain any special photographic effects, the platen may thereafter be readily returned to its original and properly aligned position by merely returning the pin 118 to contact the registration pin 120.

Having thus described our invention, what we claim is:

1. A process for producing photographic slides from art work having a plurality of portions each to be reproduced in a separate color, said process comprising the steps of:
    photographing the art work with black and white film and developing said film to obtain a first black and white negative of the art work;
    contact printing said first black and white negative with black and white film and developing said film to obtain a black and white positive of said art work;
    back-lighting said first black and white negative with a first color and photographing said back-lighted negative with color film;
    back-lighting said black and white positive with a second color and photographing said back-lighted positive with said color film; and
    processing said color film into a photographic slide.

2. The process for producing photographic slides from art work having a plurality of portions each to be reproduced in a separate color, said process comprising the steps of:
    photographing the art work with black and white film and developing said film to obtain first, second and third black and white negatives of the art work;
    opaquing first portions of the plurality of portions in said art work on said second black and white negative;
    opaquing second portions of said plurality of portions on said third black and white negative;
    back-lighting said second black and white negative with a second color and photographing said negative with color film;
    back-lighting said third black and white negative with a third color and photographing said third negative with said color film; and
    processing said color film into a color slide with said first portions in said third color and said second portions in said second color.

3. The process claimed in claim 2 including the additional steps prior to the step of back-lighting said second black and white negative, said additional steps being:
    contact printing said first black and white negative with black and white film and developing said film to obtain a black and white positive of said art work;
    sandwiching said black and white positive with a background slide, back-lighting said background slide and photographing with said color film to obtain on said color film a latent image of said background slide without said plurality of portions.

4. The process claimed in claim 1, 2 or 3 wherein said black and white films are provided with sprocket perforations and said steps of contact printing, back-lighting and photographing, and sandwiching are performed with said films mounted in a platen having means for engaging said sprocket perforations and for rigidly retaining said films.

5. The process claimed in claim 4 wherein said platen includes:
    a transparent aperture corresponding in size to the frame of said black and white film, a pair of spaced sprocket pins rigidly extending from the first side of said aperture and normal to the plane of said aperture for engaging a corresponding pair of first sprocket perforations on one side of said film; and a single sprocket pin extending from the second side of said aperture, normal to the plane of said aperture and spring-biased in a direction away from said first side, said single sprocket pin for engaging a second sprocket perforation in said film and for exerting a force between said first and second sprocket perforations for tensioning and rigidly retaining said film over said aperture.

6. A platen assembly applicable to a photographic slide duplicator for rigidly retaining edge perforated photographic film, said platen assembly including:

a hollow tubular frame having a circular base section for rotatably positioning said assembly on the slide duplicator, said frame having an upper section with a planar top surface normal to the axis of said hollow frame, the hollow portion in said upper section being rectangular and substantially conforming in shape to the frame of the photographic film;

at least two first registration pins rigidly extending from said planar top surface and normal thereto, said pins being in a line adjacent and parallel with the first edge of said rectangular hollow portion, said first edge underlying the perforations in said photographic film;

a second pin vertically extending from said planar top surface and adjacent the edge opposite said first edge, said second pin positioned to engage a film perforation on the opposite side of the film frame and substantially midway between the position from said first registration pins; and spring-biasing means coupled to said second pin for urging said pin in a direction away from said first registration pins.

7. The platen assembly claimed in claim 6 further including a glass cover plate overlying said rectangular hollow section, said plate for supporting one surface of a photographic film.

8. The platen assembly claimed in claim 7 further including a cover, said platen cover having a rectangular center aperture overlying the rectangular hollow portion of said tubular frame, said rectangular aperture containing a cover glass coplanar with the lower surface of said platen, and adapted to contact the second surface of said photographic film.

9. The platen assembly claimed in claim 8 further including a movable X-Y stage supporting said hollow tubular frame for orthogonally adjusting the position of said platen assembly.

10. The platen assembly claimed in claim 8 further including an adjustment ring rotatably connected to the periphery of said tubular frame and coaxial therewith, said ring supporting a registration pin adapted to contact the corresponding non-movable registration pin whereby said platen assembly may be rotatably adjusted and returned to a predetermined position.

* * * * *